United States Patent [19]
Wentworth

[11] 3,819,292
[45] June 25, 1974

[54] PROGRAMMED PRESSURE EXTRUDER VALVE

[75] Inventor: William P. Wentworth, Rockford, Ill.

[73] Assignee: Beloit Corporation, Beloit, Wis.

[22] Filed: Nov. 10, 1972

[21] Appl. No.: 305,222

[52] U.S. Cl.............. 415/150, 137/487.5, 425/191
[51] Int. Cl...................... F01d 17/20, F16d 31/04
[58] Field of Search................. 137/487.5; 425/191; 415/47, 150, 151

[56] References Cited
UNITED STATES PATENTS
2,469,786  5/1949  Rieber .......................... 137/487.5
3,307,217  3/1967  Cameron .......................... 425/191

Primary Examiner—Henry F. Raduazo
Attorney, Agent, or Firm—Hill, Gross, Simpson, Van Santen, Steadman, Chiara & Simpson

[57] ABSTRACT

Automatic extruder valve for hot melt plastic including a housing having a barrel chamber with an inlet passageway leading into the barrel chamber and an outlet passageway leading from the barrel chamber with a screen and breaker plate separating the inlet from the outlet passageway. The inlet passageway has a diverging discharge end forming a tapered valve seat cooperating with the tapered metering valve element, to maintain a programmed pressure in the extruder chamber. A reversible motor moves the valve element in and out along the valve seat through a geared drive connection. A pressure sensing transducer in the inlet passageway controls operation of the motor to effect movement of the valve in and out in accordance with flow requirements to match the pressure setting of a pressure setting control.

13 Claims, 4 Drawing Figures

PROGRAMMED PRESSURE EXTRUDER VALVE

FIELD OF THE INVENTION

Programmed pressure extruder valve of the type found in Class 425.

BACKGROUND, SUMMARY AND ADVANTAGES OF THE INVENTION

Prior Art

This invention is an improvement upon the U.S. Pat. No. to Cameron 3,307,217, dated Mar. 7, 1967 and assigned to the assignee of the present invention, in that the extruder valve of the Cameron patent is manually adjustable in an effort to arrive at a relatively constant pressure in the barrel chamber of the extruder, while the extruder valve of the present invention provides an automatically controlled power operated drive for the metering valve including a reversible motor controlled by the inlet pressure of the hot melt plastic to maintain a programmed pressure of hot melt plastic in the barrel chamber of the extruder proportionate to the output of the extruder screw.

Programmed barrel pressure in an extruder proportionate to the output of the extruder screw helps maintain constant mixing characteristics of the plastic material which is both desirable and necessary since it results in a high quality film of homogeneous appearance. The use of a manually operated needle valve, such as in the Cameron U.S. Pat. No. 3,307,217 and other conventional extruders, to maintain a constant pressure in the barrel chamber of the extruder has not been entirely satisfactory due to the inaccessiblity of the regulating means for the metering valve, the high temperature in the vicinity of the valve, the fact that small contaminants tend to clog the filtering screen and make it necessary to change the valve area to counteract this clogging, and the difficulty in maintaining a constant pressure without continuous attention to the valve.

The present invention overcomes the foregoing problems by providing continuous automatic and remote programmed control of the valve area, in which the barrel chamber pressure may be set to be proportionate to the output of the extruder screw and the metering valve will maintain this pressure automatically by in and out movement of the valve along its valve seat, as changes in screw output require an enlarged or reduced flow area past the metering valve, to maintain the proper pressure in the barrel chamber proportionate to the output of the extruder screw.

The present invention consists of a threaded metering valve element in the form of a needle valve upstream of the barrel chamber of the extruder breaker plate and screen element. A pressure sensing transducer, which may be a pressure cell, is located in the inlet passageway of the valve to sense inlet pressure and control the position of the valve by this pressure for programming the pressure in accordance with extruder screw output. The valve stem is moved in and out by a reversible motor through a gear train, and is controlled by a solenoid operated servo-valve, supplying fluid under pressure to the motor in one direction to advance the valve stem toward the valve seat and limit the flow through the valve and increase the barrel chamber pressure. Rotation of the motor in an opposite direction causes the valve stem to move outwardly along the valve seat and thereby increase the flow area of the valve and reduce the barrel chamber pressure.

The control circuit for reversing the motor and controlling operation of the solenoid controlled fluid pressure valve includes an electric servo-amplifier comparing a signal from the pressure transducer to a preselected pressure signal. This comparison is through a feedback servo-loop system, whereby the electric servo-amplifier selects the solenoid valve position to bring the barrel chamber pressure up to or down to the programmed pressure determined by the extruder screw output in accordance with the setting of the pressure setting control for the servo-valve and motor.

The advantages of the present invention are that a programmed barrel chamber pressure may be maintained from a position remote from the extruder valve proper, with little, if any, attention from the operator of the extruder.

A further advantage of the invention is that a high quality film of homogeneous appearance is attained by preselected the barrel chamber pressure for a preselected output of the extruder screw and maintaining this barrel chamber pressure proportionate to the output of the extruder screw by operation of a motor operated extruder valve.

A further advantage in the invention is the provision of a motor-driven extruder valve moving the extruder valve in or out along a contoured valve seat in accordance with the setting of a pressure setting control, remote from the valve proper.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 4 is a block diagram schematically illustrating the pressure-setting control for the valve and the feedback servo-loop system controlling the direction of rotation of the hydraulic motor.

DESCRIPTION OF PREFERRED EMBODIMENT OF INVENTION

Figure 1:
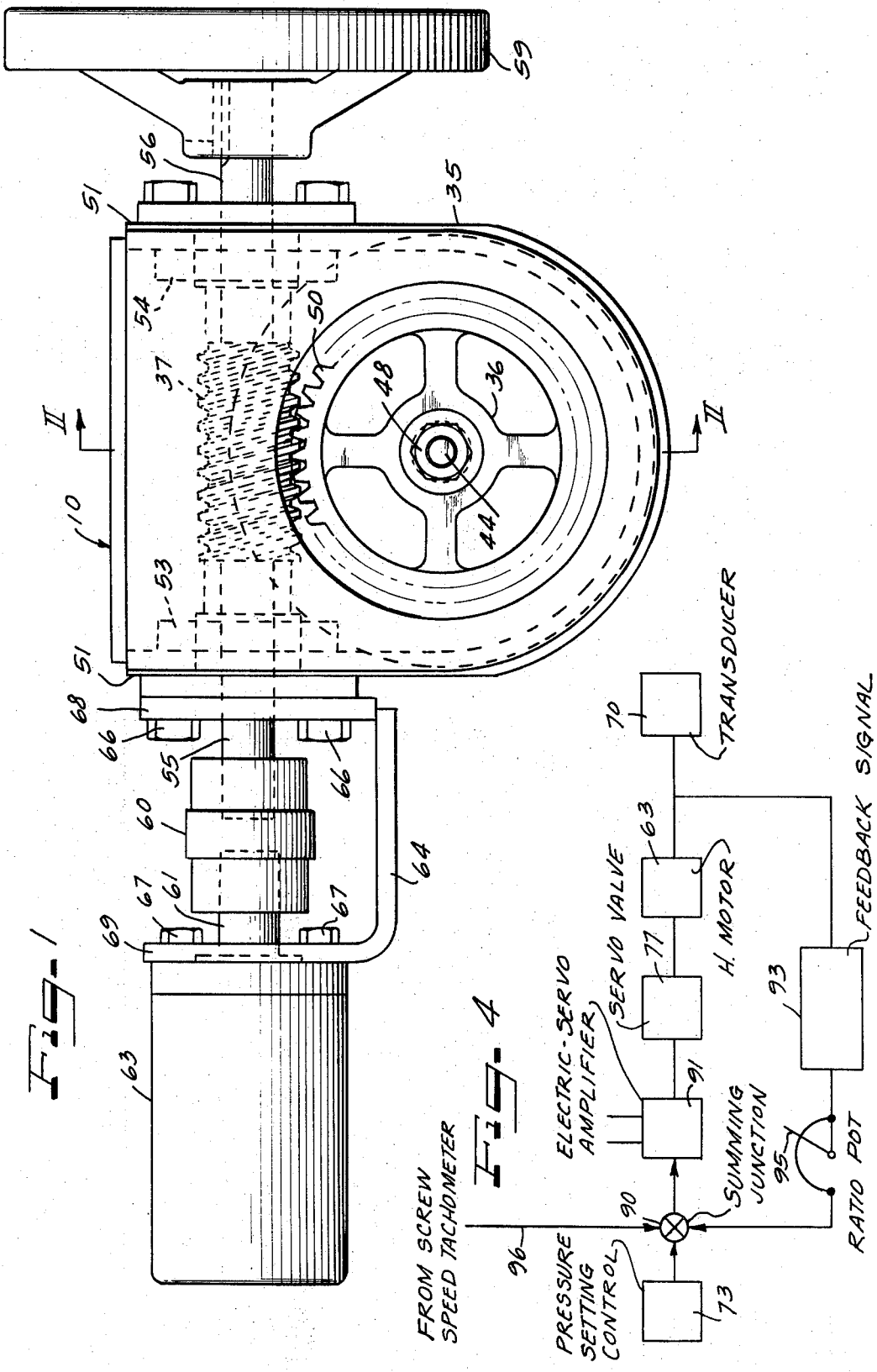
FIG. 1 is an end view of an extruder constructed in accordance with the principles of the present invention and looking at the extruder towards the valve operating end thereof.
Figure 2:
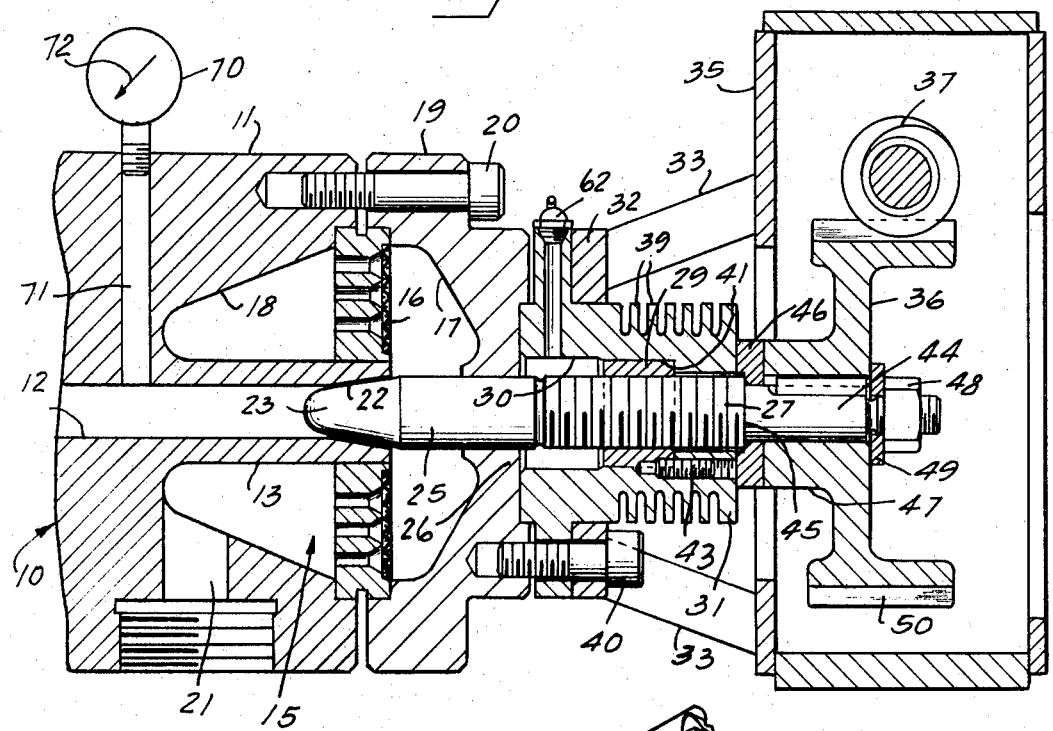
FIG. 2 is a fragmentary sectional view of the extruder valve, with certain parts broken away.

In the drawings, I have shown in FIGS. 1 and 2, a portion of an extruder 10 including a barrel housing 11 having an inlet passageway 12 leading thereinto as shown and described in the aforementioned Cameron U.S. Pat. No. 3,307,217, and supplied with hot melt plastic material by a conventional extruder screw (not shown). The inlet passageway 12 leads along an interior boss-like portion 13 extending along a barrel chamber 15 and terminating at the downstream end of a breaker plate and screen 16 similar to that shown in U.S. Pat. No. 3,307,217. The breaker plate and screen 16 divide the barrel chamber 15 into an upstream end 17 and a downstream end 18. An end cap 19 has a recessed inner end portion defining the upstream end 17 of the barrel chamber 15 and retains the breaker plate and screen 16 to the extruder housing 11 as by cap screws 20 threaded in the end of the barrel housing and suitably sealed thereto. An outlet 21 leads from the downstream barrel chamber 18 to deliver the hot melt plastic material after it is passed through the breaker plate and screen 16, to a mold and the like.

The inlet 12 has a uniformly tapering discharge end 22 forming the valve seat for a needle or metering valve 23 and conforming to the taper of said metering valve 23. The metering valve 23 is shown as being formed integrally with the inner end of a valve stem 25 extending through an end plate 26 of the end cap 19, for slidable movement with respect thereto, to move the metering valve 23 along the valve seat 22 to vary the flow area between said valve and seat. The stem 25 extends a substantial distance outwardly of the end plate 26 and has a threaded portion 27 threaded in a nut 29 mounted within a hollow interior portion 30 of a stem support 31. The stem support 31 has a series of heat radiating fins 39 formed integrally therewith and forms a support for a ring 32 having a series of arms 33 extending radially of said stem support and ring and angularly outwardly therefrom. The arms 33 form supports at their outer ends for a housing 35 for a worm gear 36 and worm 37.

The ring 32 abuts a shouldered portion of the stem support 31 and is secured thereto as by cap screws 40 threaded in the end plate 26 of the end cap 19 and also securing said stem support to said end cap. The nut 29 abuts a shouldered portion 41 of the hollow interior portion 30 of the stem support 31, and is held in abutting engagement therewith and from rotation with respect thereto, as by a series of socket head screws 43 threaded in said stem support from the end thereof and also threaded in the outer portion of the nut 29, as shown in FIG. 2, to retain said nut from rotation and thereby accommodate rotation of the stem 25 to effect axial movement of the metering valve 23 along the tapered valve seat 22.

The stem 25 has a reduced diameter outer end portion 44 forming a shoulder abutted by a recessed portion of a stop collar 46 abutted by the inner end of a hub 47 of the worm gear 36. The hub 47 of the worm gear 36 is carried on the reduced diameter outer end portion 44 of the stem 25 and is keyed or otherwise secured thereto. A nut 48 threaded on a reduced diameter outer end of the stem 25 abuts a washer 49 to lock the worm gear to the stem 25.

The worm gear 36 is shown as having relatively long face gear teeth 50 to accomodate in and out movement of said worm gear with the stem 25 as said stem is advanced along or retracted with respect to the tapered valve seat 22. The stop collar 46 is provided to prevent closing off of the passage between the tapered seat 22 and the metering valve 23.

As shown in FIG. 1. the casing for the worm 37 and worm gear 36 generally conforms to the form of the worm gear adjacent its lower end portion and has parallel upper walls 51,51 at its opposite sides forming supports for bearing housings 53 and 54 for shafts 55 and 56, respectively, for the worm 37 and projecting from opposite ends thereof. A hand wheel 59 is keyed or otherwise secured to the shaft 56 to turn the worm 37 and worm gear 36 by hand in cases of power failure. The shaft 55 has a coupler 60 keyed or otherwise secured thereto coupled to the outer end of a shaft 61 of a fluid pressure operated motor 63 as by keying or other securing means.

The motor 63 is shown as extending outwardly of an upright leg 69 of a motor bracket 64 as by cap screws 67. The motor bracket 64 is shown as being in the form of an angle bracket having a horizontal leg welded or otherwise secured to a bracket plate 68 secured to an end plate 51 of the housing 35 as by cap screws 66.

As the screw speed decreases, there is a corresponding decrease in pressure in the inlet passageway 12. A signal is sent to change the fluid supplied to the motor 63, causing the metering valve 23 to move inwardly along the tapered valve seat 22 and reduce the flow into the barrel 15. This increases the pressure in the inlet 12 to maintain the constant set pressure going through the valve. The supply of fluid under pressure to the motor 63 in an opposite direction will reverse the direction of axial movement of the metering valve 23 and increase the flow area between said metering valve and the tapered passageway or seat 22 and thereby result in an increased flow and decrease pressure in the inlet 12. Reverse rotation of the motor 63 by increasing or decreasing the flow area between the metering valve 23 and tapered seat 22 may thus maintain the pressure in the extruder barrel at a programmed value in accordance with extruder screw output, regardless of variations in extruder screw output and consistency or pressure of the hot melt plastic in the inlet passageway 12.

The extruder housing 11 may be maintained at a constant temperature by suitable heating means which may encircle said housing, as shown and described in the Cameron U.S. Pat. No. 3,307,217 so not herein shown or described. The temperature of the hot melt plastic in the inlet 12 may be determined by a thermocouple (not shown) which may control the heater (not shown) as in U.S. Pat. No. 3,307,217. The valve stem 25 may be lubricated by an Alemite fitting 62 in a grease passageway leading into the chamber 30.

The control system for the fluid pressure operated motor 63 is under the control of a transducer, which may be a pressure cell 70 of a conventional form. The pressure cell 70 has communication with the inlet passageway 12 through a radial passageway 71 leading from said inlet passageway. The pressure cell may include as a part thereof, a gauge 72, indicating the pressure of hot melt plastic in the passageway 12, and may send out an electric signal in accordance with the pressure in the passageway 12 and may maintain a predetermined constant pressure in the extruder barrel 15 in accordance with a signal set up by a pressure setting control 73 (FIG. 4) to maintain the metering valve in the required position relative to the tapered valve seat 22 to maintain the pressure in the extruder chamber 15 constant. The pressure valve and pressure sensitive control along with the servo control system for the hydraulic motor 63 is diagrammatically shown in FIGS. 3 and 4 and will hereinafter be more fully described as this specification proceeds.

Figure 3:
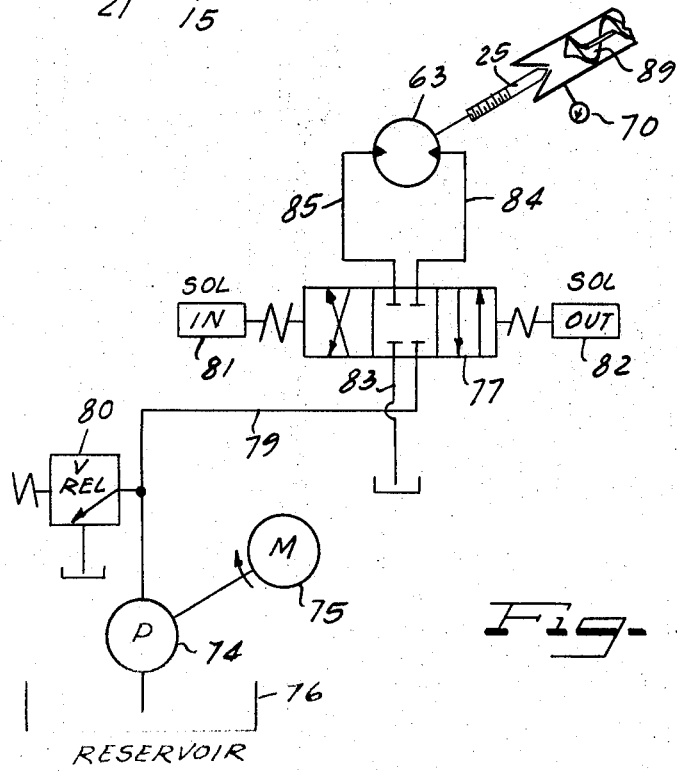
FIG. 3 is a schematic view illustrating the hydraulic circuit to the valve operating motor.

In FIG. 3 of the drawings I have shown a fluid pressure diagram schematically illustrating a form of fluid pressure control to the hydraulic motor 63, which may be used. In this system, a source of fluid under pressure includes a pump 74 driven by an electric motor 75 connected with a source of power at line voltage through a suitable switch and control means (not shown). The pump 74 draws fluid from a reservoir 76 and supplies fluid under pressure to a servo valve 77 through a pressure line 79. A relief valve 80 is connected with the pressure line 79 and returns fluid to the reservoir 76 upon excessive pressure conditions in the pressure line 79, to protect the pump 74.

The servo-valve 77 is shown as being a three position fourway valve, which may be operated by solenoid coils 81 and 82 diagrammatically shown as being at opposite ends of said valve. The servo-valve 77 may be of any suitable form and is shown in FIG. 3 in its neutral position, returning fluid to tank through a return line 83. A pressure line 84 leads from the servo-valve 77 to one side of the motor 63 for supplying fluid under pressure thereto to rotate the motor in one direction while a second pressure line 85 leads from the servo-valve 77 to the opposite side of the motor 63 to supply fluid under pressure thereto to reverse the direction of rotation of said motor. When the line 85 is a pressure line, the line 84 will be a return line, returning fluid under pressure to tank through the return line 83 and vice versa. Thus, when the valve is in position so the parallel arrows connect the pressure line 79 with the pressure line 84, and connect the return line 85 with the return line 83, the motor 63 will rotate in a counterclockwise direction. When the valve is in position so the crossing arrows have communication between the pressure line 79 and the pressure line 85, and the return line 84 and return line 83 the direction of rotation of the hydraulic motor 63 will be reversed, in a well-known manner. The motor 63 is shown diagrammatically as having drive connection with the threaded valve stem 25, for moving said valve stem in and out relative to the tapered seating portion of the inlet passageway 12, to vary the flow through said passageway into the barrel chamber 15. In FIG. 3, a screw 89, which may be in the form of a conventional screw conveyor for hot melt plastic extruders, is diagrammatically shown as supplying hot melt plastic to the passageway 12. The pressure cell 70 is also shown as having communication with said passageway 12.

In FIG. 4 of the drawings, I have shown in block form a feedback servo-loop system controlling the direction of rotation of the motor 63 by the servo-hydraulic valve 77 in accordance with the pressure in the inlet passageway 12, as previously described. This block diagram shows the pressure cell or tansducer 70, the hydraulic motor 63, the servo-hydraulic valve 77, the pressure setting control 73 and a summing junction 90 connected between said pressure setting control 73 and an electric servo-amplifier 91. The pressure cell or transducer 70 is connected with the summing junction 90 through a feedback signal 93, feeding the signal set up by the transducer through a ratio pot 94, which may be in the form of a potentiometer, back to the summing junction and pressure setting control 73, to form a conventional form of feedback servo-loop system. The ratio pot may be manually adjustable to vary the feedback signal and cooperate with the pressure setting control 73 to program the delivery pressure of the valve in accordance with extruder screw delivery pressure. A connection 96 is provided from an extruder screw speed tachometer to the summing junction to establish a rate control cooperating with the pressure setting control to program the pressure in accordance with the speed of the extruder screw in a conventional manner. The various components and the feedback servo-loop system including screw speed tachometer rate control connections, the ratio pot and the operation thereof are well-known to those skilled in the art, and include conventional components which operate in a well-known manner, so need not be shown or described in detail herein.

As for example, the pressure setting control 73 may include a resistor (not shown) connected between the terminals of a source of electric power, such as a constant voltage source (not shown). A knob and hand lever (not shown) and indicia indicating the setting of the knob for a particular pressure to be selected may cut the resistance in or out in accordance with the voltage designated for a particular pressure. The setting of the control may also be automatically varied by the rate control connection in accordance with tachometer screw speed. The voltage, for example, may be from 0 to 6 volts.

The pressure cell or transducer 70 may then send a voltage signal to the feedback signal different from the setting of the pressure setting control. If, for example, the pressure setting control is set to deliver a voltage of 3 volts to the summing junction, and the transducer sends out a voltage of minus 3 volts, the voltage at the summing junction will be 0 and the metering valve will remain stationary. The transducer and feedback signal may be a negative signal, while the pressure setting control may be a positive signal, and the difference between these signals determines the position of the servo-valve 77 and rotation of the hydraulic motor 63 to restrict or increase the flow of hot melt plastic into the barrel chamber until the voltages of the summing junction again equal 0. Thus, a negative value at the summing junction will cause the motor 63 to rotate in one direction while a positive value will effect reversal in the direction of rotation of the motor 63.

A control system has thus been provided which assures a pressure in the barrel chamber programmed in accordance with extruder screw output, which may be manually set from a position remote from the valve and may be automatically maintained by the programmed pressure in the inlet to the barrel chamber, operating the servo-valve to drive the hydraulic motor and metering valve in one direction or another or to hold said metering valve in position in accordance with variations in pressure in the inlet passageway, and requirements to maintain the pressure in the barrel chamber programmed to a predetermined extruder screw output.

I claim as my invention:

1. In a power operated extruder valve and in combination with a control system therefor controlling the valve to deliver hot melt plastic at a programmed pressure, a housing having a chamber therein,
an inlet passage for hot melt plastic leading into said housing and chamber,
an outlet passage leading from said chamber,
said inlet passage having a diverging upstream end forming a metering seat,
a metering valve conforming to said metering seat,
a reversible hydraulic motor for moving said metering valve back and forth along said seat for maintaining a programmed pressure at the delivery end of said seat,
pressure sensing means sensing the pressure in said inlet passageway, control means controlled by said pressure sensing means for reversing the direction of rotation of said motor and moving said valve in and out along said seat in accordance with pressure requirements, means cooperating with said pressure sensing means for preselecting the delivery pressure of said extruder valve to maintain a pressure of hot melt plastic in said chamber in accordance with extruder screw output, a servo-valve supplying fluid under pressure to said motor under the control of said means preselecting the delivery pressure of said metering valve and in cooperation with said pressure sensing means, and a control circuit between said means for preselecting the delivery pressure of said metering valve and said pressure sensing means controlling the supply of fluid under pressure to said servo-valve, and determining the position of said metering valve and the direction of rotation of said motor in accordance with extruder screw output.

2. The extruder of claim 1, wherein electrically energizable means are provided for operating said servo-valve and the control circuit for said electrically energizable means is in the form of a feedback servo-loop system.

3. The extruder of claim 1,
wherein electrically energizable means are provided for operating said servo-valve, and
wherein a pressure setting control cooperating with said pressure sensing means is provided to effect energization of said electrically energizable means in accordance with the pressure of hot melt plastic at said inlet, and the setting of said pressure setting control.

4. The extruder valve of claim 3,
wherein the pressure setting control is an electrically energizable control, and
wherein the pressure sensing means is a transducer sending out a negative signal in accordance with the pressure in said hot melt plastic inlet, and
wherein a servo-loop feedback system from said transducer to said pressure setting control determines the position of said servo-hydraulic valve and the direction of operation of said hydraulic motor in accordance with the pressure in said inlet.

5. The extruder valve of claim 4, including an electro-servo-amplifier energized through line voltage and a connection from said electro-servo-amplifier to said electrically energizable means for said servo-hydraulic valve determining the position of said metering valve in accordance with the signal fed back by said transducer and pressure setting control.

6. An extruder valve for hot melt plastic comprising a housing,
a chamber for hot melt plastic within said housing,
an inlet passageway for hot melt plastic leading into said chamber,
an outlet passageway leading from said chamber,
screen and breaker means in said chamber separating said inlet passageway from said outlet passageway, said inlet passageway having a uniformly tapered discharge end forming a metering seat,
a metering valve guided in said housing for axial movement therealong in axial alignment with said inlet passageway and having a tapered metering valve element generally conforming to the taper of said valve seat,
said valve element having a threaded stem, a nut threaded on said stem and held from rotation relative to said housing,
a reversible motor,
a rotatable drive connection from said reversible motor to said stem for moving said metering valve axially into and out of said seat in accordance with the pressure of hot melt plastic in said inlet passageway, to establish pressure in said outlet programmed in accordance with extruder screw pressure and thereby attain constant mixing characteristics of the hot melt plastic material, and
stop means limiting movement of said valve element into said seat and preventing closing of said valve.

7. The metering valve of claim 6, wherein the drive connection from said motor to said stem comprises a geared drive connection including a gear secured to said stem and axially movable therewith and stop means limiting axial movement of said stem and valve element along said seat.

8. The extruder valve of claim 7, wherein the motor is a reversible motor and the geared drive connection from said motor to said stem includes a worm driven by said motor and a worm gear driven thereby and having direct drive connection with said stem.

9. The extruder valve of claim 8,
wherein the motor is on one side of said worm gear and a coupling is provided between said motor and worm, and
wherein a hand wheel is on the opposite side of said worm and has drive connection therewith for manually adjusting said valve element.

10. The extruder valve of claim 9, wherein the motor is a reversible fluid pressure operated motor and the control means for said motor comprises a servo-valve, a transducer subject to the pressure of hot melt plastic in said inlet passageway, a closed loop control system from said transducer, and a pressure setting control for said system controlling operation of said servo-valve and operation of said motor and metering valve element in accordance with a programmed delivery pressure of said valve.

11. The extruder valve of claim 10, wherein the means for programming the delivery pressure of said metering valve includes a feedback connection from said transducer to said means preselecting the delivery pressure of said metering valve, and to said servo-valve for operating said servo-valve in accordance with the pressure in said inlet to maintain the preselected delivery pressure of said metering valve.

12. The extruder valve of claim 11, wherein the control connection is a closed loop feedback including an electric servo-amplifier amplifying the difference in signals sent out of said pressure setting control and said transducer and supplying current to operate said servo-valve in the required direction in accordance with the voltage signal delivered to said amplifier, and thereby controlling operation of said motor to attain a uniform pressure of hot melt plastic in said chamber.

13. The extruder of claim 11, wherein the control connection includes a ratio pot operable to vary the feedback to said electric servo-amplifier.

* * * * *